United States Patent
Hung et al.

(10) Patent No.: US 8,988,787 B2
(45) Date of Patent: Mar. 24, 2015

(54) SYSTEM AND METHOD TO DEPLOY ACTIVE DAMPENING FOR LENS RINGING AND VIBRATION

(71) Applicant: QUALCOMM Incorporated, San Diego, CA (US)

(72) Inventors: Hau Ling Hung, San Diego, CA (US); Haibo Zhong, San Diego, CA (US); Jeyaprakash Soundrapandian, San Diego, CA (US); Rajakumar Govindaram, San Diego, CA (US); Sreesudhan Ramakrish Ramkumar, San Diego, CA (US); Ruben M. Velarde, Chula Vista, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/830,442

(22) Filed: Mar. 14, 2013

(65) Prior Publication Data
US 2013/0286491 A1    Oct. 31, 2013

Related U.S. Application Data

(60) Provisional application No. 61/639,368, filed on Apr. 27, 2012.

(51) Int. Cl.
| | |
|---|---|
| G02B 15/14 | (2006.01) |
| G02B 7/02 | (2006.01) |
| G03B 13/32 | (2006.01) |
| G03B 17/00 | (2006.01) |

(52) U.S. Cl.
CPC ............... *G02B 7/023* (2013.01); *G03B 13/32* (2013.01); *G03B 17/00* (2013.01); *G03B 2217/00* (2013.01)
USPC .......................................................... 359/698

(58) Field of Classification Search
USPC .................................... 359/697, 698; 396/77
See application file for complete search history.

(56) References Cited

U.S. PATENT DOCUMENTS

| | | | |
|---|---|---|---|
| 6,104,880 A | 8/2000 | Kamishita et al. | |
| 7,463,436 B2 | 12/2008 | Takahashi et al. | |

(Continued)

FOREIGN PATENT DOCUMENTS

| | | |
|---|---|---|
| EP | 1855135 A1 | 11/2007 |
| WO | 9703378 A1 | 1/1997 |
| WO | WO-2006093934 A1 | 9/2006 |

OTHER PUBLICATIONS

International Search Report and Written Opinion—PCT/US2013/032358, International Search Authority—European Patent Office, Nov. 4, 2013.

*Primary Examiner* — Joseph P Martinez
(74) *Attorney, Agent, or Firm* — Knobbe Martens Olson & Bear LLP

(57) ABSTRACT

Described herein are methods, apparatus, and computer readable medium to autofocus a lens of an imaging device. Parameters are received indicating a lens position. Lens actuator characteristics are determined. Lens damping parameters may be determined based, at least in part, on the input parameters and the lens actuator characteristics. In some aspects, lens damping parameters include a lens movement step size and a time delay between each step. In some aspects, the lens damping parameters include damping parameters for a plurality of regions of lens movement. Lens movement parameters are determined based, at least in part, on the input parameters and the lens damping parameters. The lens is then autofocused by moving it according to the lens movement parameters.

25 Claims, 9 Drawing Sheets

(56) References Cited

U.S. PATENT DOCUMENTS 7,697,829 B1 * 4/2010 Gutierrez et al. ............... 396/85
7,769,281 B1 8/2010 Gutierrez
7,796,876 B2 9/2010 Lee
8,190,015 B2 5/2012 Li et al.

* cited by examiner

SYSTEM AND METHOD TO DEPLOY ACTIVE DAMPENING FOR LENS RINGING AND VIBRATION

CROSS-REFERENCE TO RELATED APPLICATIONS

This disclosure claims priority to U.S. Provisional Patent Application No. 61/639,368 filed Apr. 27, 2012, entitled "METHOD AND APPARATUS FOR DAMPING LENS RINGING AND VIBRATION," and assigned to the assignee hereof. The disclosure of this prior application is considered part of, and is incorporated by reference in, this disclosure.

TECHNICAL FIELD

The present embodiments relate to imaging devices, and in particular, to methods and apparatus for damping ringing and vibration in the lens of an imaging device.

BACKGROUND

Digital imaging devices with an adjustable focus may employ one of many types of lens actuators, including a voice coil motor (VCM) actuator, a microelectromechanical systems (MEMS) actuator, or a Shape Memory Alloy (SMA) actuator etc.,. Image capture devices may also have a lens driver controlling an actuator that moves a lens assembly for adjusting focus in the image capture device. During operation of the actuator to adjust the position of the lens, vibration may be introduced to the lens.

This vibration may come from many sources. For example, in a lens adjustment mechanism employing a voice coil motor design, the stimuli for movement of the lens induces vibration in springs supporting the lens. The vibration of the lens may continue for some time before settling at the desired lens position. For example, this vibration or ringing of the lens may last anywhere from approximately 50 milliseconds to approximately 200 ms, and can adversely affect auto-focus (AF) speed and accuracy. The ringing may also adversely affect desired image capture settings and hence image quality. To mitigate the adverse effects of lens ringing, imaging devices may wait a predetermined threshold period of time after completing a lens movement before capturing an image with the lens. This predetermined threshold period of time may allow the lens to stop ringing before an image is captured, but also reduces the speed of autofocus operation.

The need for an imaging device to wait for a predetermined threshold period of time after completing a lens movement may have adverse effects on the speed at which an imaging device may capture images. For example, in imaging environments with dynamic scenes and focus conditions, a photographer may desire to minimize any delay between when a scene is presented and when the scene may be captured by an imaging device. To the extent the imaging device introduces a delay in image capture to provide for any lens ringing to settle, the captured image may vary from the image selected by the photographer. Similarly, video image capture may also be adversely affected by lens ringing, given the frame rate at which most video is recorded.

SUMMARY

Some of the present embodiments may include a method of auto focusing a lens. The method includes determining a current lens position, determining a target lens position, determining at least two lens movement regions based on the current lens position and the target lens position, determining at least two lens movement damping parameters corresponding to the at least two lens movement regions, determining lens movement parameters based on the at least two lens movement damping parameters, and moving the lens based on the lens movement parameters to autofocus the lens. In some aspect, the method further includes determining a direction of lens movement, and determining the at least two lens movement damping parameters based on the direction of lens movement. In some aspects, the method further includes determining a distance of lens movement within one of the at least two lens movement regions, and determining lens movement damping parameters corresponding to the lens movement region based on the distance of lens movement within the region. In some aspects, the damping parameters include a lens movement step size and a time delay between each step. In some aspects, the regions are based on lens actuator characteristics across a lens displacement range. In some aspects, the lens moves through the at least two regions when moving from the current lens position to the target lens position.

Another aspect disclosed is an apparatus for auto-focusing a lens. The apparatus includes a lens, a lens actuator, a processor, operably coupled to the lens actuator, a memory, operably coupled to the processor, and configured to store an auto focus control module, configured to determine a current lens position and a target lens position, a lens actuator characteristics determination module, configured to determine at least two regions based on the current lens position and the target lens position, a lens damping parameters determination module, configured to determine at least two lens movement damping parameters corresponding to the at least two lens movement regions, a lens movement parameters determination module, configured to determine lens movement parameters based on the at least two lens movement damping parameters, and a lens movement control module, configured to move the lens based on the lens movement parameters to autofocus the lens. In some aspects, the lens damping parameters determination module is further configured to determine a direction of lens movement and determine the at least two lens movement damping parameters based on the direction of lens movement. In some aspects, the lens damping parameters determination module is further configured to determine a distance of lens movement within one of the at least two lens movement regions, and determine lens movement damping parameters corresponding to the lens movement region based on the distance of lens movement within the region. In some aspects, the damping parameters comprise a lens movement step size and a time delay between each step. In some aspects, the regions are based on lens actuator characteristics across a lens displacement range. In some aspects, the lens moves through the at least two regions when moving from the current lens position to the target lens position.

Another aspect disclosed is an apparatus for auto-focusing a lens. The apparatus includes means for determining a current lens position and a target lens position, means for determining at least two regions based on the current lens position and the target lens position, means for determining at least two lens movement damping parameters corresponding to the at least two lens movement regions, means for determining lens movement parameters based on the at least two lens movement damping parameters, and means for moving the lens based on the lens movement parameters to autofocus the lens. In some aspects the means for determining lens movement damping parameters is configured to determine a direction of lens movement and determine the at least two lens movement damping parameters based on the direction of lens movement. In some aspects, the means for determining lens movement damping parameters is configured to determine a distance of lens movement within one of the at least two lens movement regions, and determine lens movement damping parameters corresponding to the lens movement region based on the distance of lens movement within the region. In some aspects, the damping parameters comprise a lens movement step size and a time delay between each step. In some aspects, the regions are based on lens actuator characteristics across a lens displacement range. In some aspects, the lens moves through the at least two regions when moving from the current lens position to the target lens position.

Another aspect disclosed is a non-transitory computer readable medium that includes instructions that when executed cause a processor to perform a method of auto-focusing a lens, the method including determining a current lens position, determining a target lens position, determining at least two lens movement regions based on the current lens position and the target lens position, determining at least two lens movement damping parameters corresponding to the at least two lens movement regions, determining lens movement parameters based on the at least two lens movement damping parameters, and moving the lens based on the lens movement parameters to autofocus the lens. In some aspects, the method further includes determining a direction of lens movement, and determining the at least two lens movement damping parameters based on the direction of lens movement. In some aspects, the method further includes determining a distance of lens movement within one of the at least two lens movement regions; and determining lens movement damping parameters corresponding to the lens movement region based on the distance of lens movement within the region. In some aspects, the damping parameters comprise a lens movement step size and a time delay between each step. In some aspects, the regions are based on lens actuator characteristics across a lens displacement range. In some aspects, the lens moves through the at least two regions when moving from the current lens position to the target lens position.

Another aspect disclosed is a method of auto-focusing a lens. The method includes determining a current lens position, determining a target lens position; determining a direction of lens movement based on at least the current lens position and the target lens position, determining a magnitude of lens movement based on at least the current lens position and the target lens position, determining lens movement damping parameters based on the direction and magnitude of lens movement, determining lens movement parameters based on the lens movement damping parameters, and moving the lens based on the lens movement parameters to autofocus the lens. In some aspects, the method also includes determining at least two lens movement regions based at least the current lens position and the target lens position, and determining at least two lens movement damping parameters corresponding to the at least two lens movement damping parameters. In some aspects, the method also includes determining a distance of lens movement within one of the at least two lens movement regions; and determining lens movement damping parameters corresponding to the lens movement region based on the distance of lens movement within the region. In some aspects, the damping parameters comprise a lens movement step size and a time delay between each step. In some aspects, the regions are based on lens actuator characteristics across a lens displacement range. In some aspects, the lens moves through the at least two regions when moving from the current lens position to the target lens position.

Another aspect disclosed is an apparatus for auto-focusing a lens. The apparatus includes a lens, a lens actuator, a processor, operably coupled to the lens actuator, a memory, operably coupled to the processor, and configured to store an auto focus control module, configured to determine a current lens position and a target lens position, and to determine a magnitude and direction of lens movement based on the current and target lens positions, a lens damping parameters determination module, configured to determine lens movement damping parameters based on the magnitude and direction of lens movement, a lens movement parameters determination module, configured to determine lens movement parameters based on the lens movement damping parameters; and a lens movement control module, configured to move the lens based on the lens movement parameters to autofocus the lens.

In some aspects, the apparatus includes a lens actuator characteristics determination module, configured to determine at least two regions based on the current lens position and the target lens position, wherein the lens damping parameters determination module is further configured to determine at least two lens movement damping parameters corresponding to the at least two lens movement regions. In some aspects, the lens damping parameters determination module is further configured to determine a distance of lens movement within one of the at least two lens movement regions, and determine lens movement damping parameters corresponding to the lens movement region based on the distance of lens movement within the region. In some aspects, the damping parameters include a lens movement step size and a time delay between each step. In some aspects, the regions are based on lens actuator characteristics across a lens displacement range. In some aspects, the lens moves through the at least two regions when moving from the current lens position to the target lens position.

Another aspect disclosed is an apparatus for auto-focusing a lens. The apparatus includes means for determining a current lens position and a target lens position, means for determining a direction of lens movement based on at least the current and target lens position, means for determining a magnitude of lens movement based on at least the current and target lens position, means for determining at least two lens movement damping parameters based on at least the direction and magnitude of lens movement, means for determining lens movement parameters based on the lens movement damping parameters; and means for moving the lens based on the lens movement parameters to autofocus the lens. In some aspects, the apparatus also includes means for determining at least two regions based on the current lens position and the target lens position, wherein the means for determining lens movement damping parameters is configured to determine at least two lens movement damping parameters corresponding to the at least two regions. In some aspects, the means for determining lens movement damping parameters is configured to determine a distance of lens movement within one of the at least two lens movement regions, and determine lens movement damping parameters corresponding to the lens movement region based on the distance of lens movement within the region. In some aspects, the damping parameters comprise a lens movement step size and a time delay between each step. In some aspects, the regions are based on lens actuator characteristics across a lens displacement range. In some aspects, the lens moves through the at least two regions when moving from the current lens position to the target lens position.

Another aspect disclosed is a non-transitory computer readable medium comprising instructions that when executed cause a processor to perform a method of auto-focusing a lens. The method includes determining a current lens position, determining a target lens position, determining a direction of lens movement based on at least the current lens position and the target lens position, determining a magnitude of lens movement based on at least the current lens position and the target lens position, determining lens movement damping parameters based on the direction and magnitude of lens movement, determining lens movement parameters based on lens movement damping parameters; and moving the lens based on the lens movement parameters to autofocus the lens. In some aspects, the method also includes determining at least two lens movement regions based on the current and target lens positions, and determining the at least two lens movement damping parameters based on the direction of lens movement. In some aspects, the method also includes determining a distance of lens movement within one of the at least two lens movement regions; and determining lens movement damping parameters corresponding to the lens movement region based on the distance of lens movement within the region. In some aspects, the damping parameters comprise a lens movement step size and a time delay between each step. In some aspects, the regions are based on lens actuator characteristics across a lens displacement range. In some aspects, the lens moves through the at least two regions when moving from the current lens position to the target lens position.

Another aspect disclosed is a method of auto-focusing a lens. The method includes determining a current lens position, determining a target lens position, determining a direction of lens movement based on at least the current lens position and the target lens position, determining a magnitude of lens movement based on at least the current lens position and the target lens position, determining lens movement damping parameters based on at least the direction and magnitude of lens movement, determining lens movement parameters based on at least the lens movement damping parameters, and moving the lens based on the lens movement parameters to autofocus the lens. In some aspects, the method also includes determining one or more lens movement regions based on at least the current lens position and the target lens position, and determining the lens movement damping parameters based on the one or more lens movement regions. In some of these aspects, the method also includes determining a distance of lens movement within a lens movement region, and determining lens movement damping parameters corresponding to the lens movement region based on the distance of lens movement within the region. In some aspects of the method, the damping parameters comprise a lens movement step size and a time delay between each step. In some aspects, the regions are based on lens actuator characteristics across a lens displacement range. In some aspects, the lens moves through the at least two regions when moving from the current lens position to the target lens position.

Another aspect disclosed is an apparatus for auto-focusing a lens. The apparatus includes a lens, a lens actuator, a processor, operably coupled to the lens actuator, a memory, operably coupled to the processor, and configured to store, an auto focus control module, configured to determine a current lens position and a target lens position, and to determine a magnitude and direction of lens movement based on the current and target lens positions, a lens damping parameters determination module, configured to determine lens movement damping parameters based on at least the magnitude and direction of lens movement, a lens movement parameters determination module, configured to determine lens movement parameters based on the lens movement damping parameters, and a lens movement control module, configured to move the lens based on the lens movement parameters to autofocus the lens. In some aspects, the apparatus also includes a lens actuator characteristics determination module, configured to determine one or more lens movement regions based on the current lens position and the target lens position, wherein the lens damping parameters determination module is further configured to determine the lens movement damping parameters based on the one or more lens movement regions. In some aspects, the lens damping parameters determination module is further configured to determine a distance of lens movement within a lens movement region, and determine lens movement damping parameters corresponding to the lens movement region based on the distance of lens movement within the region. In some aspects, the damping parameters comprise a lens movement step size and a time delay between each step. In some aspects, the one or more lens movement regions are based on lens actuator characteristics across a lens displacement range. In some aspects, the lens moves through the one or more lens movement regions when moving from the current lens position to the target lens position.

Another aspect disclosed is an apparatus for auto-focusing a lens. The apparatus includes means for determining a current lens position and a target lens position, means for determining a direction of lens movement based on at least the current and target lens position. means for determining a magnitude of lens movement based on at least the current and target lens position, means for determining lens movement damping parameters based on at least the direction and magnitude of lens movement, means for determining lens movement parameters based on the a lens movement damping parameters, and means for moving the lens based on the lens movement parameters to autofocus the lens. In some aspects, the apparatus also includes means for determining one or more lens movement regions based on the current lens position and the target lens position, wherein the means for determining lens movement damping parameters is configured to determine the lens movement damping parameters based on the one or more lens movement regions. In some aspects, the damping parameters comprise a lens movement step size and a time delay between each step. In some aspects, the one or more lens movement regions are based on lens actuator characteristics across a lens displacement range. In some aspects, the lens moves through the one or more lens movement regions when moving from the current lens position to the target lens position.

Another aspect disclosed is a non-transitory computer readable medium comprising instructions that when executed cause a processor to perform a method of auto-focusing a lens. The method includes determining a current lens position, determining a target lens position, determining a direction of lens movement based on at least the current lens position and the target lens position, determining a magnitude of lens movement based on at least the current lens position and the target lens position, determining lens movement damping parameters based on the direction and magnitude of lens movement, determining lens movement parameters based on the lens movement damping parameters, and moving the lens based on the lens movement parameters to autofocus the lens. In some aspects, the method also includes determining one or more lens movement regions based on the current and target lens positions, and determining the lens movement damping parameters based on the one or more lens movement regions. In some aspects, the method also includes determining a distance of lens movement within a lens movement region, and determining lens movement damping parameters corresponding to the lens movement region based on the distance of lens movement within the region. In some aspects, the damping parameters comprise a lens movement step size and a time delay between each step. In some aspects, the regions are based on lens actuator characteristics across a lens displacement range. In some aspects, the lens moves through the at least two regions when moving from the current lens position to the target lens position.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
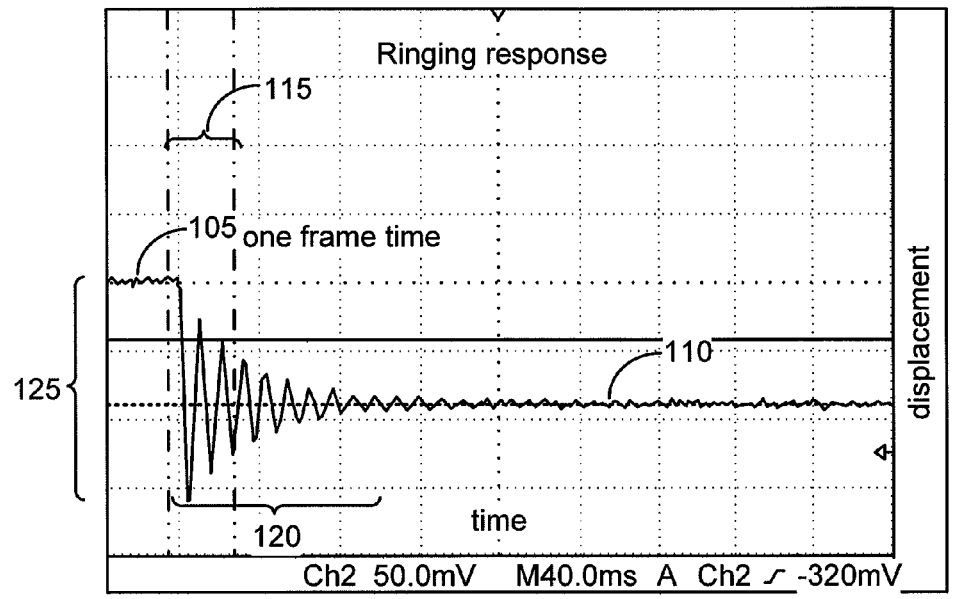
FIG. 1 illustrates the vibration of a lens in an imaging device.

Implementations disclosed herein provide systems, methods and apparatus for generating a stereoscopic image with an electronic device having one or more imaging sensors. Some embodiments include determining a vertical disparity between two images captured by the imaging sensors, correcting the vertical disparity by generating at least one corrected image, and generating a stereoscopic image pair based on the corrected image.

The present embodiments further contemplate displaying the stereoscopic image pair on a display screen. One skilled in the art will recognize that these embodiments may be implemented in hardware, software, firmware, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Embodiments include methods, apparatus, and computer readable media that are configured to reduce ringing of a lens. The movement of the lens may be adjusted based on lens actuator characteristics and/or auto focus process dynamics. For example, some lens actuators may exhibit characteristics such as variations in lens displacement for a given change in an input. In some embodiments, the input may be an actuation voltage or current. Variations in lens displacement may also be based on the relative position of the lens within its displacement range.

In one embodiment of the disclosed methods and apparatus, these variations in actuator displacement may be considered when moving the lens to affect an autofocus operation. For example, the movement of the lens may be adjusted to reduce or mitigate ringing or vibration of the lens resulting from the movement. Damping parameters may be determined to effect this adjustment. How movement of the lens is adjusted by the damping parameters may vary based on the position of the lens within its range of movement. In some embodiments, the amount of lens displacement for a given change in an input may be less in a nonlinear region than in a linear region. For example, when the lens is in an initial region of movement, damping control may be less necessary as there may be no or little lens movement in response to an input in that region. Therefore, damping parameters may be less aggressive in adjusting movement of the lens when in such a region. In contrast, more lens movement may occur for a given change in an input when the lens is in a region characterized as a "linear" region of movement. When moving a lens through such a region, damping parameters may be more aggressive in modifying the behavior of the lens movement to reduce ringing. For example, each region of lens movement may have damping parameters specific to that region.

Auto focus process dynamics may include a direction of lens movement and a magnitude of lens displacement. Auto focus process dynamics may be used to adapt lens damping parameters when auto focusing a lens. For example, some actuators may exhibit different lens ringing characteristics when moved in a first direction as compared to a second direction. A lens that rings more severely when moved in a first direction may be moved more slowly in that direction than when moved in a second direction, at least in one implementation.

Additionally, the distance of lens movement may affect the type and degree of ringing induced by the movement. For example, moving a lens a greater distance may cause the lens to ring more severely than when the lens is moved a shorter distance. As a result, damping parameters may be adjusted to actively mitigate the effects of lens ringing based on the lens movement distance.

In some implementations, the lens damping methods may be implemented entirely by hardware. In other implementations, the lens damping methods may be implemented in software. In still other implementations, the hardware may provide lens damping but may not be sufficient to optimally address the ringing effects. In such cases the combination of software and hardware lens damping methods may be employed to achieve the desired lens movement.

FIG. 1 illustrates vibration of a lens in an imaging device. The lens is moved from a first displacement 105 to a second displacement 110. The imaging sensor utilized with the illustrated lens may capture an image once per frame time, illustrated by time period 115. Therefore, it may be desirable to capture an image at a frequency less than or equal to time period 115. When moving from the first displacement 105 to the second displacement 110, FIG. 1 shows oscillation or lens vibration 125 in the displacement of the lens. FIG. 1 also shows a lens stabilization time 120. Time 120 may allow vibrations introduced to the lens during movement to settle such that the lens may be reliably used to capture an image. Lens stabilization time 120 may be a function of the magnitude of oscillation or vibration 125. If the lens stabilization time 120 exceeds the frame time 115, the capture rate of the imaging sensor may be reduced to provide for lens stabilization. Solutions that can reduce lens stabilization time 120 may therefore reduce the time between when a lens is moved and when an image may be captured.

Figure 2:
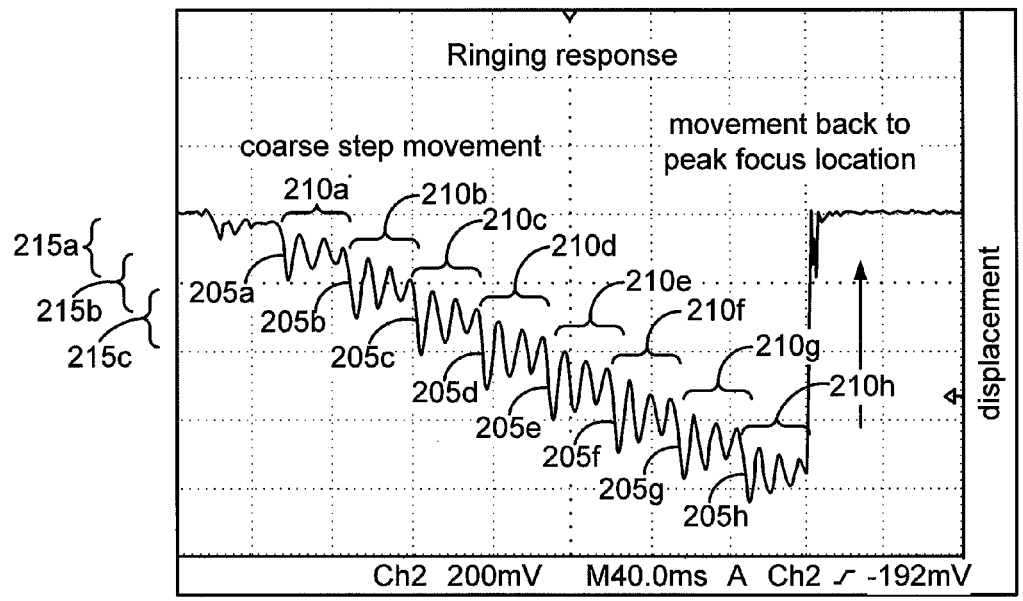
FIG. 2 illustrates the vibration of a lens in an imaging device during an autofocus search.

FIG. 2 illustrates the vibration of a lens in an imaging device during an autofocus search. The autofocus search process includes moving the lens to multiple lens positions 205a-h. In the illustrated embodiment of an autofocus search, an image contrast may be determined at each lens position 205a-h. In an embodiment, the lens position that results in an image of greatest contrast may be selected as the position providing the best focus. In the illustrated embodiment, movement of the lens to each of positions 205a-h may result in a ringing of the lens illustrated by oscillations 210a-h. These oscillations have a strength or height illustrated by, for example, 215a-c. Some embodiments of the autofocus search may delay capturing an image at each focus position 205a-h until the oscillations 210a-h are reduced sufficiently to provide a stable image focus. These one or more delays may result in a slower autofocus search process, increasing the time required for the imaging device to focus the lens and capture an image. To improve the speed of an autofocus search, some embodiments may capture an image at each position before the oscillations 210a-h have sufficiently subsided to produce a stable imaging environment.

Figure 3:
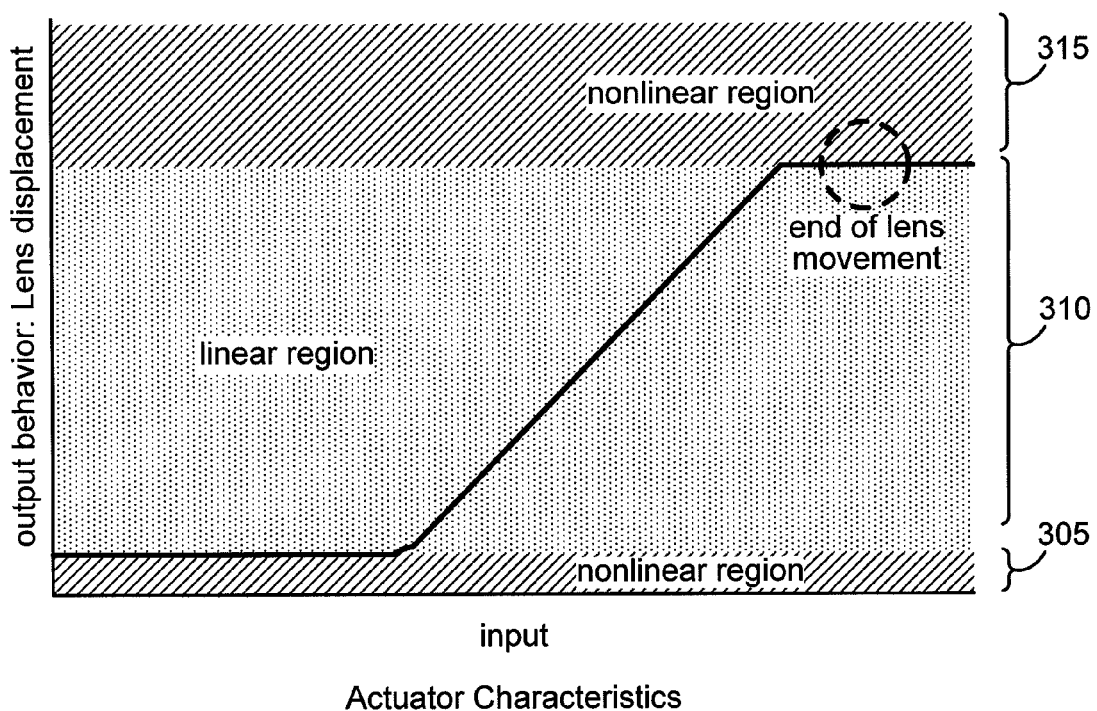
FIG. 3 shows a line graph of the lens displacement of one embodiment of an imaging device based on an input.

FIG. 3 shows a line graph of the lens displacement of one embodiment of an imaging device based on an input value. In the illustrated embodiment, the input is an input current. As an input current increases from zero (0), the resulting lens displacement is first non-linear with respect to the input current in region 305. In region 310, the change in lens displacement is linear relative to the increasing input current. In region 315, the change in lens displacement again becomes non-linear with respect to the input current, as the lens reaches the end of its displacement range. Some of the disclosed embodiments may utilize a relationship between a change in lens displacement relative to a change in an input, such as an input current, such as that shown in FIG. 3, to dampen lens vibration or ringing resulting from a change in lens position.

Figure 4:
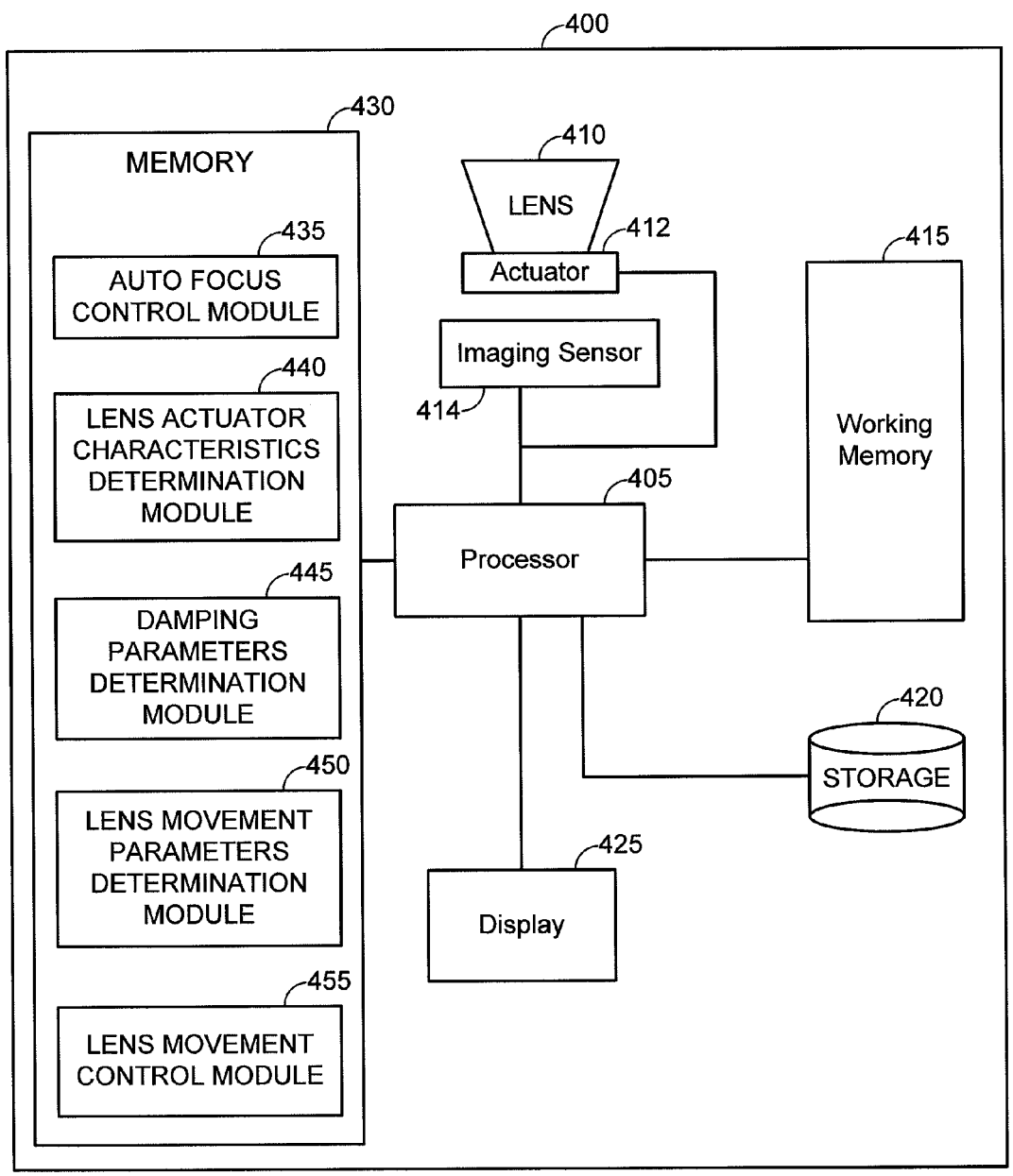
FIG. 4 is a block diagram of an imaging device implementing at least some of the disclosed embodiments.

FIG. 4 is a block diagram of an imaging device implementing one of the disclosed embodiments. Imaging device 400 includes a processor 405 which is operably connected to a lens 410, actuator 412, imaging sensor 414, working memory 415, storage 420, display 425, and memory 430. Light enters the lens 410 and is focused on the imaging sensor 414. In one aspect, the imaging sensor 414 utilizes a charge coupled device. In another aspect, the imaging sensor 414 utilizes either a CMOS or CCD sensor. The lens is moved by the actuator 412, which has a displacement range. When the lens 410 reaches a boundary of its displacement range, the lens or actuator 412 may be considered saturated. The lens may be actuated by any method known in the art to include a voice coil motor (VCM), Micro-Electronic Mechanical System (MEMS), or a shape memory allow (SMA). The working memory 415 may be utilized by the processor 405 to store data dynamically created during operation of the imaging device 400. For example, instructions from any of the modules stored in the memory 430 (discussed below) may be stored in working memory 415 when executed by the processor 405. The working memory 415 may also store dynamic run time data, such as stack or heap data utilized by programs executing on processor 405. The storage 420 may be utilized to store data created by imaging device 420. For example, images captured via lens 410 may be stored on storage 420. The display 425 is configured to display images captured via lens 410, and may also be utilized to implement configuration functions of device 400.

The memory 430 may be considered a computer readable media and stores several modules. The modules store data values defining instructions for processor 405. These instructions configure the processor 405 to perform functions of device 400. For example, in some aspects, memory 430 may be configured to store instructions that cause the processor 405 to perform any of methods 500, 600, 700, or 750, or portions thereof, as described below. In the illustrated embodiment, the memory 430 includes an auto focus control module 435, lens actuator characteristics determination module 440, a lens damping parameters determination module 445, a lens movement parameters determination module 450, and a lens movement control module 455.

The auto focus control module 435 includes instructions that configure processor 405 to autofocus the lens 410. Instructions in the auto focus control module 435 may configure processor 405 to effect a lens position for lens 410. In an embodiment, the instructions in the auto focus control module 435 may send the lens position information, along with other input parameters, to the lens actuator characteristic determination module 440. The lens position information may include a current lens position and a target lens position. In another embodiment, the auto focus control module 435 may send lens position information to the damping parameters determination module 445 discussed below. Therefore, instructions in the auto focus control module 435 may be one means for generating input parameters defining a lens position. In some aspects, instructions in the auto focus control module 435 may represent one means for determining a current and/or target lens position. Instructions in the damping parameters determination module 445 or instructions in the lens actuator characteristics determination module 440 may represent one means for receiving input parameters defining a lens position. In some aspects, instructions in the auto focus control module 435 may represent one means for determining a magnitude and/or direction of lens movement based on at least a current and target lens position.

Instructions in the lens actuator characteristics determination module 440 configure the processor 405 to determine actuation characteristics of the lens 410. In some aspects, a movement range of the lens may include one or more regions with corresponding and different actuation characteristics. For example, how the lens moves in response to a control input may be at least partially defined by the one or more regions through which the lens moves. Because the actuation characteristics vary by region in some aspects, the actuation characteristics may be based, at least in part, on a current lens position of the lens 410. For example, as discussed above, in some portions of a lens' displacement range, a change in lens displacement relative to an input may be linear. If an embodiment, the input may be an actuation current, with a linear increase in actuation current resulting in a corresponding linear displacement of the lens within its displacement range. In another portion of the lens' 410 displacement range, a change in the lens position in response to a change in an input may be non-linear. For example, in an embodiment, if the lens is at either end of its displacement range, its response to an increase in an actuation current may be non-linear to the increase in current.

The lens actuator characteristics determination module 440 may determine the characteristics based, at least in part, on one or more parameters stored in memory 430. For example, the characteristics may be known when the device 400 is manufactured, for example, based on a model or type of lens 410 and its actuator (not shown). Alternatively, a calibration process may be performed during the manufacturing of device 400 that determines actuation characteristics of lens 410 and stores parameters defining the characteristics in memory 430. Therefore, instructions in the lens actuator characteristics determination module 440 may represent one means for determining lens actuator characteristics. Instructions in the lens actuator characteristics determination module may also represent one means for determining at least two lens movement regions based on a current lens position and a target lens position. Instructions in the lens actuator characteristics determination module may also represent one means for determining one or more lens movement regions based on a current lens position and a target lens position Instructions in the lens damping parameters determination module 445 configure processor 405 to determine damping parameters, based, at least in part, on the lens actuator characteristics determined in the lens actuator characteristics determination module 440. The damping parameters may also be determined based on input parameters defining a target lens position, generated by the auto focus control module 435. The damping parameters may also be determined based on a current lens position of lens 410. In some aspects, the damping parameters may be determined based on a lens movement direction and/or lens movement magnitude. The direction and magnitude may be based, at least in part, on the current and target lens position. Therefore, instructions in the lens damping parameters determination module 445 may represent one means for determining damping parameters, based, at least in part, on the input parameters and on lens actuator characteristics. In some cases, moving the lens 410 from a current position to a target position may cause the lens to traverse one or more regions of a lens movement range. Each region may have actuator characteristics that are at least slightly different than other regions. The damping parameters for each of these regions may also be different. Instructions in the lens damping parameters determination module 445 may represent one means for determining at least lens movement damping parameters based on one or more regions through which the lens moves.

Instructions in the lens movement parameters determination module 450 configure processor 405 to determine lens movement parameters based, at least in part, on the damping parameters and the input parameters generated by auto focus control module 435. For example, the movement parameters may be based on a target lens position of lens 410. The movement parameters may also be based on the regions through which the lens moves. For example, lens movement damping parameters may specify a lens movement step size and time delay between each step that varies by region. Therefore, instructions in the lens movement parameters determination module 450 may represent one means for determining lens movement parameters based, at least in part, on the input parameters and the lens damping parameters.

Instructions in the lens movement control module 455 configure processor 405 to move the lens 410 based on the lens movement parameters. By moving the lens, lens movement control module 455 may affect an autofocus of lens 410. Therefore, instructions in the lens movement control module 455 represent one means for moving the lens based on the lens movement parameters to autofocus the lens.

Figure 5:
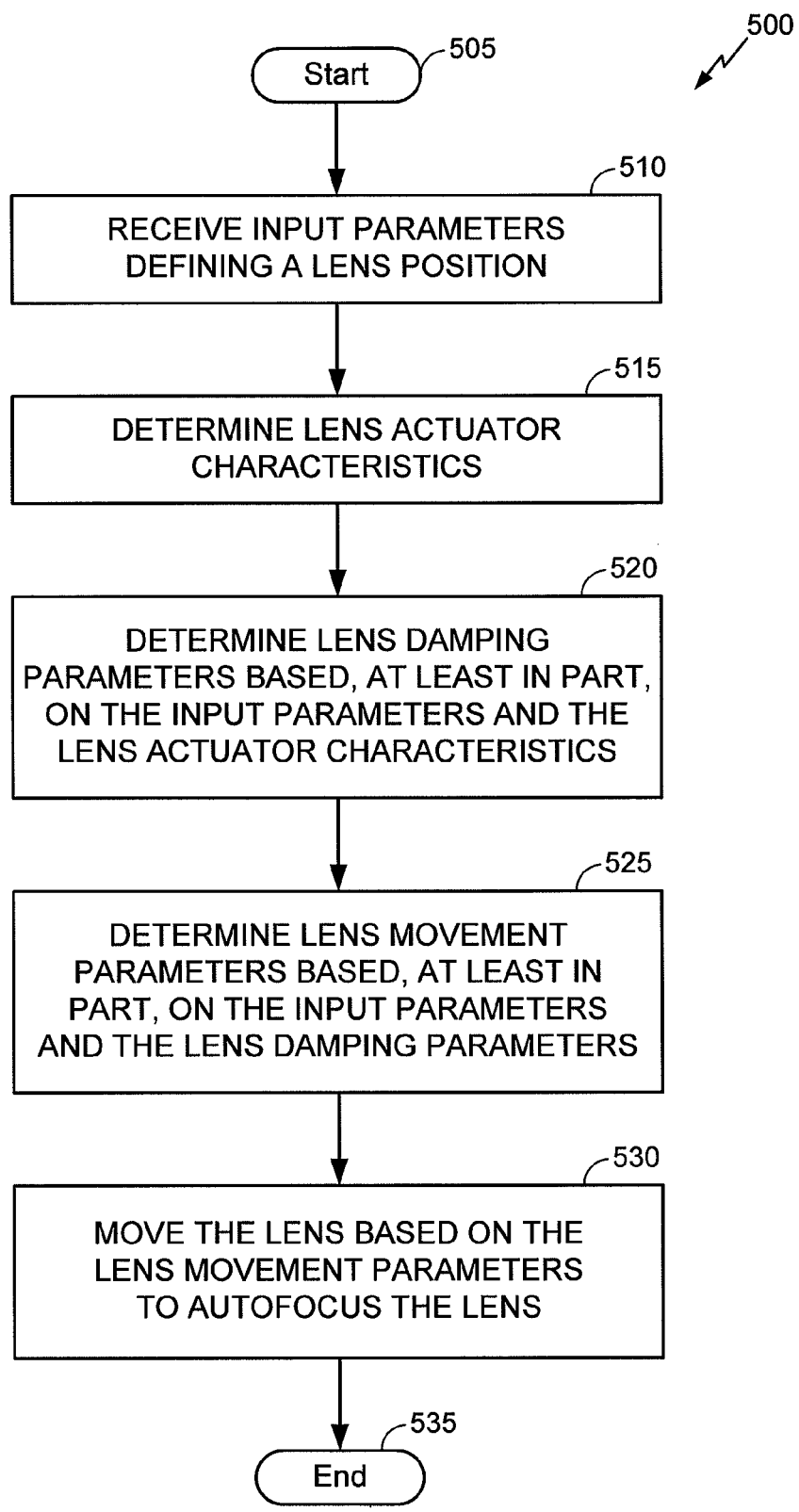
FIG. 5 is a flowchart of a method of autofocusing a lens.

FIG. 5 is a flowchart of a method of autofocusing a lens. Process 500 may be performed by imaging device 400, illustrated in FIG. 4. Process 500 begins at start block 505 and then moves to block 510, where input parameters defining a lens position are received. In an embodiment, a lens position may be determined by instructions included in the focus control module 470. The lens position may then be received by the damping parameters module 440.

The process 500 then moves to a block 515 wherein lens actuator characteristics are determined. Lens actuator characteristics define a relationship between an input, such as an input current, and a relative lens displacement. The relationship may be based on a current lens position. For example, as shown in FIG. 3, the relationship between an input and a relative lens displacement may be characterized by one or more regions. In some regions, the relationship may be linear. In some other regions, the relationship may be non-linear. Lens actuator characteristics may also be based on a direction of movement.

In an embodiment, the lens actuator characteristics may be determined during manufacturing of the imaging device performing process 500. For example, lens actuator characteristics may be based on a particular lens design. In one aspect, lens actuator characteristics may be based on a type of actuation, material used to actuate the lens, or the weight of the lens. Alternatively, or in addition, lens actuator characteristics may be determined via diagnostic or calibration tests during manufacturing of the imaging device. In another embodiment, lens actuator characteristics may be determined periodically after manufacture of the imaging device.

The process 500 then moves to block 520, wherein lens damping parameters are determined based, at least in part, on the input parameters and the lens actuator characteristics. Lens damping parameters may be determined so as to reduce vibrations or ringing in the lens resulting from movement of the lens to the lens position defined by the input parameters. As mentioned, the lens damping parameters may be based on lens actuator characteristics.

Lens damping parameters may also be based on auto focus dynamics of the lens. For example, a lens may be more susceptible to ringing or vibration when moved in a first direction and less susceptible to ringing or vibration when moved in a second direction. A lens that rings more severely in a first direction may be moved more slowly in that direction than when moved in a second direction that is less susceptible to ringing. A lens may be more susceptible to ringing based on the magnitude of a movement necessary for it to achieve the lens position. In an embodiment, if the magnitude of the movement is relatively low, the damping parameters may be less aggressive in adjusting the movement of the lens to reduce vibration or ringing. If the magnitude of the movement necessary to effect the lens position is larger, the damping parameters may be more aggressive in adjusting the movement of the lens to reduce vibration or ringing. Lens damping parameters may include a maximum lens speed or a maximum lens displacement at a maximum lens speed. Damping parameters may also include a maximum displacement without stopping the lens movement, or step size. Damping parameters may also include a time delay period between each movement or step of the lens.

After determining the lens dampening parameters, the process 500 moves to a block 525, wherein lens movement parameters are determined based, at least in part, on the input parameters and the lens damping parameters. In an embodiment, the movement parameters may define how the lens may be moved to effect the lens position while complying with the damping parameters. For example, in one aspect, no or less damping may be performed in non-linear regions. In some aspects, movement within a linear region may be divided into two or more separate movements, with an introduced delay between each separate movement. The delays may be limited such that a total movement time is below a maximum movement time. For example, the maximum movement time may be based on a shutter speed or frame time of the imaging device. If the lens damping parameters indicate a maximum distance the lens may be moved at a particular speed, the movement parameters may define how the lens can be moved in increments less than the maximum distance at a speed less than the particular speed.

The process 500 then moves to a block 530, wherein the lens is moved according to the lens movement parameters to autofocus the lens. Process 500 ends in block 535.

Figure 6:
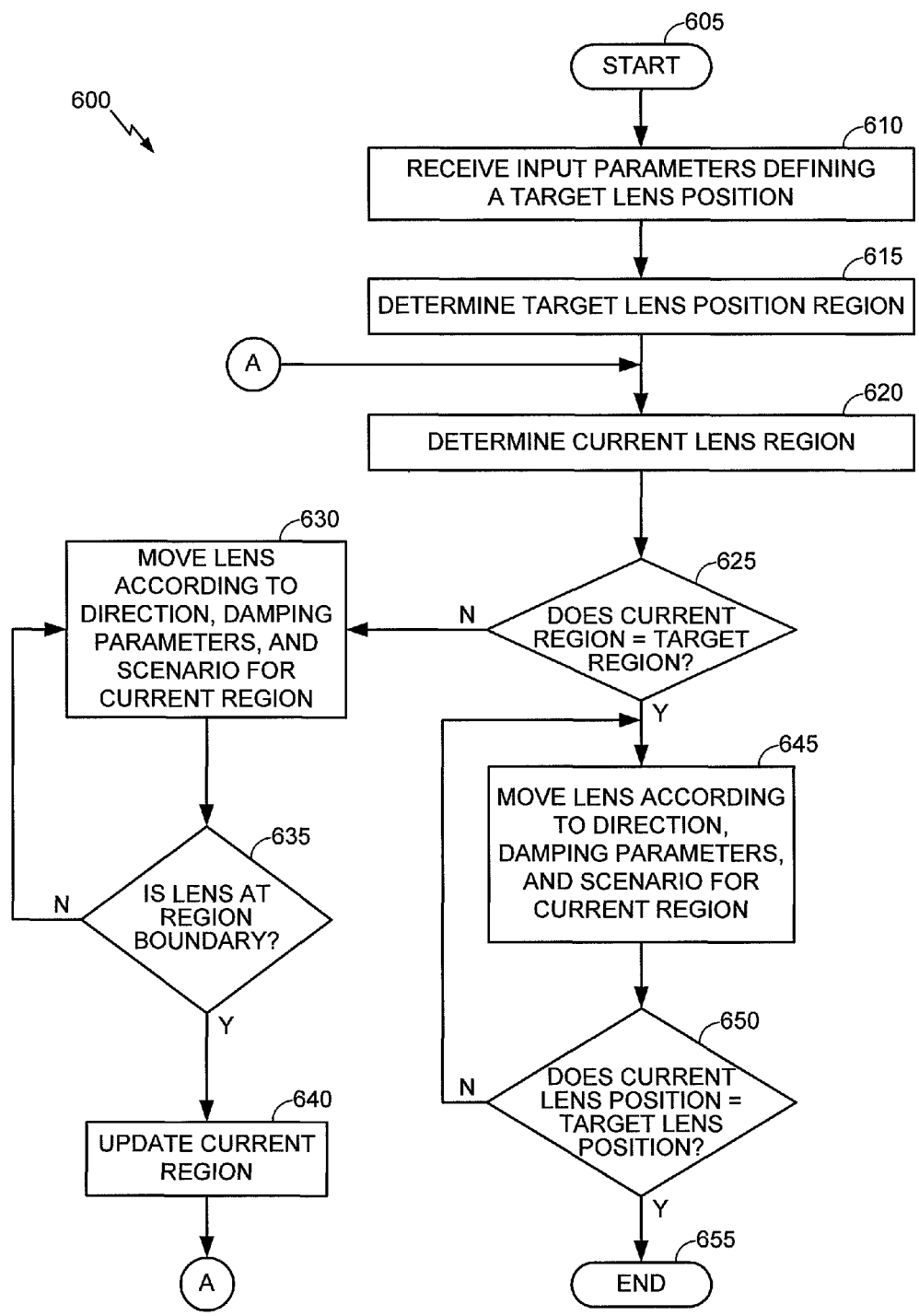
FIG. 6 is a flowchart of a method of autofocusing a lens.

FIG. 6 is a flowchart of a method of autofocusing a lens. Process 600 may be performed by imaging device 400, illustrated in FIG. 4. In some aspects, process 600 may incorporate aspects of process 500 discussed above with respect to FIG. 5, and/or process 700, discussed below with respect to FIG. 7. Process 600 begins at start block 605 and then moves to block 610, where input parameters defining a target lens position are received. In an embodiment, a target lens position may be determined by instructions included in the focus control module 470. The target lens position may then be received by the damping parameters module 440.

In block 615, a region of the target lens position is determined. In one aspect, a region may define a range of lens positions within a lens movement range. Within the range of lens positions defining the region, the behavior of the lens when moved may be characterized differently than the behavior of the lens when moved to a position that is outside the region. For example, in one aspect, a Digital to Analog Controller (DAC) code change per step may not be the same for an entire DAC range. Therefore, some aspects, may divide the DAC range into regions, with each region sharing a common DAC code change per steps parameter. In some aspects, damping parameters applied when moving the lens within the region, such as a step size or a time delay between steps, may vary based on the region.

The process 600 then moves to a 620, wherein a current lens region is determined. After the current lens region is determined the process 600 moves to a decision block 625 to determine whether the current lens region is equal to the target lens region. If not, the process 600 moves to a block 630 wherein the lens is moved according to damping parameters and a scenario for the current region. In one aspect, the damping parameters may include a step size or distance and a delay between each step. Some aspects may also include hardware damping parameters in their damping parameters. In some aspects, the damping parameters may vary depending on the length of the lens movement. For example, moving a lens from a position −4 to a position −8 may use different damping parameters than a movement of the lens from position −4 to a position −12. Similarly, moving a lens from a position −4 to a position −8 may use different damping parameters than a move from a position −4 to a position 0. Even though the size of the movement and the starting position are the same, the direction of lens movement is different in this example. Therefore, the damping parameters may also be different in some aspects, even if positions −8 to position 0 are all within the same lens movement region. For example, the damping parameters may be based on a direction of movement.

The process 600 then moves to a decision block 635 to determine whether after movement of the lens, the lens has reached a region boundary. If not, process 600 returns to block 630, where the lens is moved again according to the scenarios and damping parameters for the current lens position and direction of movement. However, if the lens has reached a region boundary, process 600 updates the current region in block 640, and then returns to block 620.

If the current region does equal the target region in decision block 625, the process 600 moves to block 645 wherein the lens is moved according to the direction, damping parameters, and scenario for the current region. The process 600 then moves to a decision block 650 to determine whether the target lens position has been reached. If it has not been reached, process 600 returns to block 645, and the lens is moved again according to the lens damping parameters and scenario for the current lens position and region. If the target lens position has been reached in block 650, process 600 is completed in end block 655.

Figure 7A:
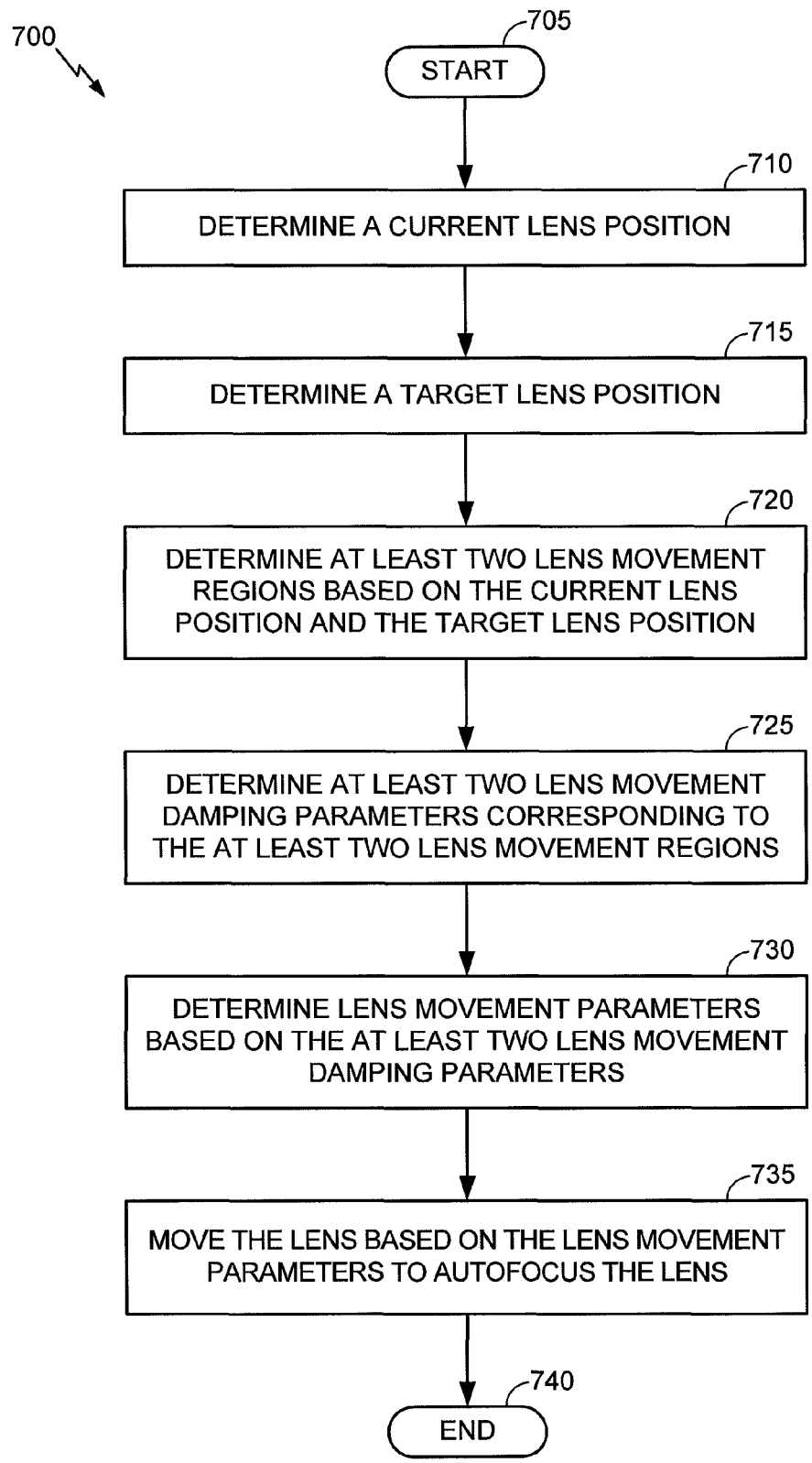
FIG. 7A is a flowchart of a method of autofocusing a lens.

FIG. 7A is a flowchart of a method of autofocusing a lens. Process 700 may be performed by imaging device 400, illustrated in FIG. 4. In some aspects, process 700 may incorporate aspects of process 600 or process 500, discussed above with respect to FIGS. 5-6 respectively. Process 700 begins at start block 705 and then moves to block 710, where a current lens position is determined. The process 700 then moves to a block 715 wherein a target lens position is determined. In block 720, at least two lens movement regions are determined based on the current lens position and the target lens position. For example, in order for the lens to move from the current lens position to the target lens position, the lens may need to move through at least two lens movement regions. Each region may have different lens actuator characteristics. For example, in each region, the lens's response to an input may be different. In a first region for example, a lens response to a control input current may be linear, in that as the control input changes, a corresponding physical displacement or change in the lens's position will occur. In some other regions, the change in the lens's position in response to the control input may be different than in the first region.

The process 700 then moves to a block 725, wherein at least two lens movement damping parameters corresponding to the at least two lens movement regions are determined. In one aspect, each of the lens movement damping parameters may be a set of one or more parameters. For example, a damping parameter set may include a lens movement step size and a time delay between each step. In these aspects therefore, a lens movement step size and time delay may be particular to each region. In some aspects, the damping parameters are further determined based on a magnitude and/or direction of lens movement within each of the corresponding regions. For example, a lens movement of relatively smaller magnitude may result in damping parameters that include a smaller larger lens movement step size and/or longer time delay between lens movement steps than damping parameters for lens movement of a relatively larger magnitude.

After determining the lens movement damping parameters, the process 700 moves to block 730, wherein lens movement parameters are determined based on the at least two lens movement damping parameters. The lens movement parameters may specify how the lens is moved across each region to the target lens position. For example, in some regions, a particular step size and time delay between steps may be applied. In some other regions, another step size and/or time delay may be applied. In block 735, the lens is moved based on the determined movement parameters, and in block 740, process 700 completes.

Figure 7B:
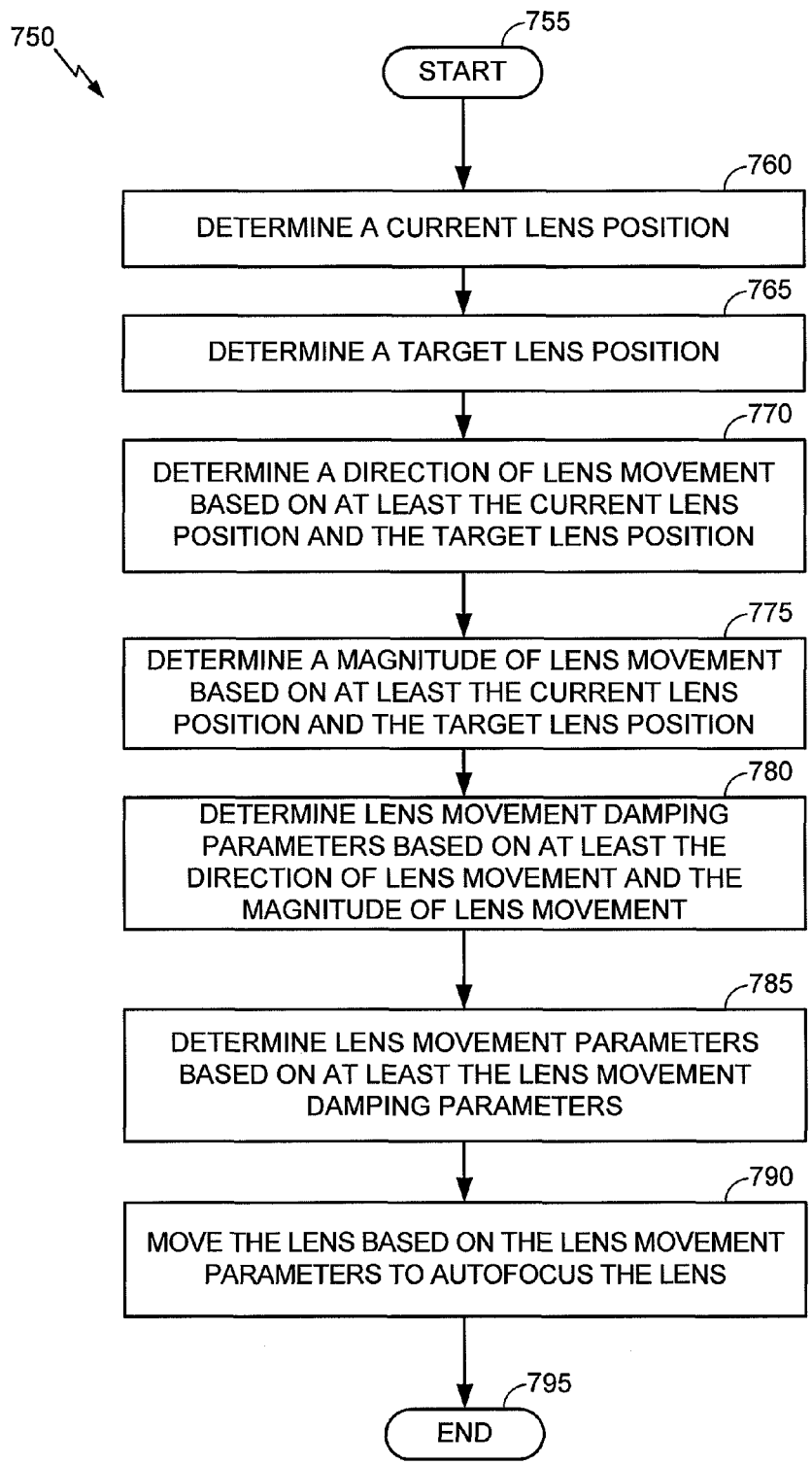
FIG. 7B is a flowchart of a method of autofocusing a lens.

FIG. 7B is a flowchart of a method of autofocusing a lens. Process 750 may be performed by imaging device 400, illustrated in FIG. 4. In some aspects, process 750 may incorporate aspects of process 700, process 600 or process 500, discussed above with respect to FIGS. 7A, 6, and 5 respectively. Process 750 begins at start block 755 and then moves to block 760, where a current lens position is determined. The process 700 then moves to a block 765 wherein a target lens position is determined. In block 770, a direction of lens movement is determined based on at least the current lens position and the target lens position. In block 775, a magnitude of lens movement is determined based on at least the current lens position and the target lens position. In an embodiment, the magnitude of lens movement may represent a physical distance of lens movement to achieve the target lens position from the current lens position. In block 780, lens movement damping parameters are determined based on at least the magnitude and direction of lens movement. In some aspects, process 750 may include the functions described above with respect to blocks 720, 725, and 730. In these aspects, two lens movement damping parameters may be determined corresponding to at least two lens movement regions through which the lens moves when moving from the current lens position to the target lens position.

In some aspects, process 750 further includes determining one or more lens movement regions based on at least the current lens position and the target lens position, and determining the lens movement damping parameters based on the one or more lens movement regions. For example, in some aspects, a lens may be moved from a current lens position that lies within a first region, to a target lens position, which also lies within the first region. Thus, this movement of the lens remains within the first region. The first region may have only one set of damping parameters that are applied to lens movement within the first region. In some aspects, a distance of lens movement within a lens movement region may be determined and lens movement damping parameters corresponding to the lens movement region may be determined based on the distance of lens movement within the region. For example, a step size and time delay between steps may be determined based on the distance and or direction of movement within the first region.

A different, second region may have a different, second set of damping parameters than the first region. Movement of a lens from a current lens position within the second region to a target lens position also within the second region may utilize the second set of damping parameters to govern or damp the lens's movement within the second region. For example, a second step size and second time delay may be applied to lens movement within the second region, where the second step size and second time delay may be different than the step size and time delay applied to movement within the first region.

In a lens movement scenario that moves the lens through both the first and second regions, both the first and second sets of damping parameters may be applied to the lens movement. For example, while the lens is moved through the first region, the first set of damping parameters may be applied to dampen the lens's movement through the first region. When the lens is moved through the second region, the second set of damping parameters may be applied to dampen the lens's movement through the second region. The regions may be based on the lens actuator characteristics within the region. For example, a first region may have common lens actuator characteristics when compared to a second region.

After determining the lens movement damping parameters, the process 750 moves to block 785, where lens movement parameters are determined based on the lens movement damping parameters. In block 790, the lens is moved based on the determined movement parameters, and in block 795, process 750 completes.

Figure 8:
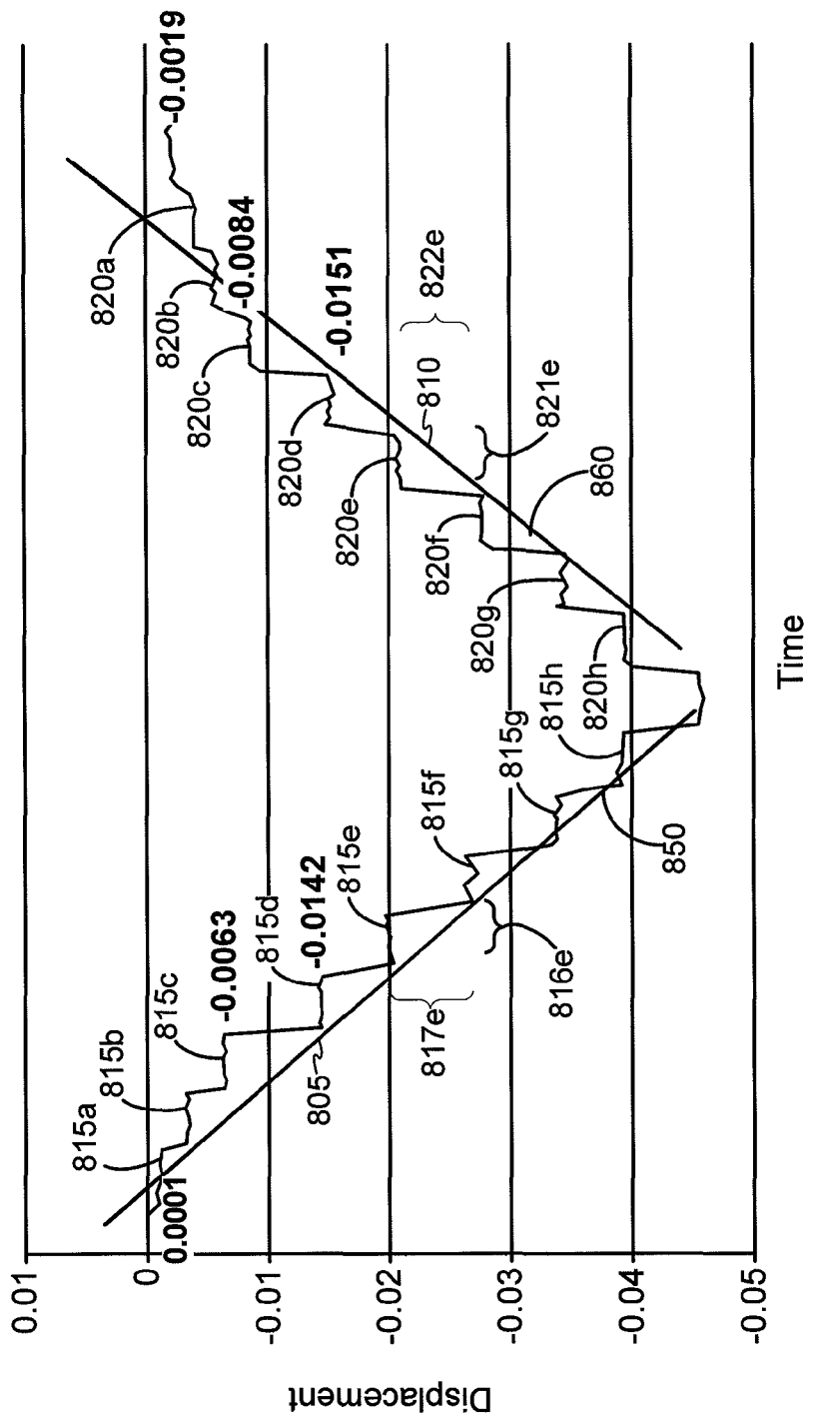
FIG. 8 is a graph illustrating the displacement of a lens when actuated in both a forward and reverse direction.

FIG. 8 is a graph illustrating the displacement of a lens when actuated in both a forward and reverse direction. The displacement of the lens over time is shown in a forward direction over a series of displacements 815a-h, and in a reverse direction over a series of displacements 820a-h. When moving in a forward direction, each change in displacement, for example, as shown by 817e, is followed by a lens settlement period, shown, for example, as 816e, corresponding to displacement 815e. Similarly, when moving in a reverse direction, each change in displacement, for example, 822e, is followed by a lens settlement period, shown, for example, as 821e, occurring when the lens is at displacement 820e. FIG. 8 shows that the lens moves more quickly in the reverse direction, represented by the change in displacement 822e, than when moving in the forward direction, represented by change in displacement 817e. This can be observed in that the slope of line 860 is steeper than the slope of line 850. The example illustrates that lens actuator characteristics may vary based on the direction of movement of a lens. Methods and apparatus that consider the direction of lens movement may provide for improved lens stability and/or reduced focus time for the lens in some lens movement scenarios.

Figure 9:
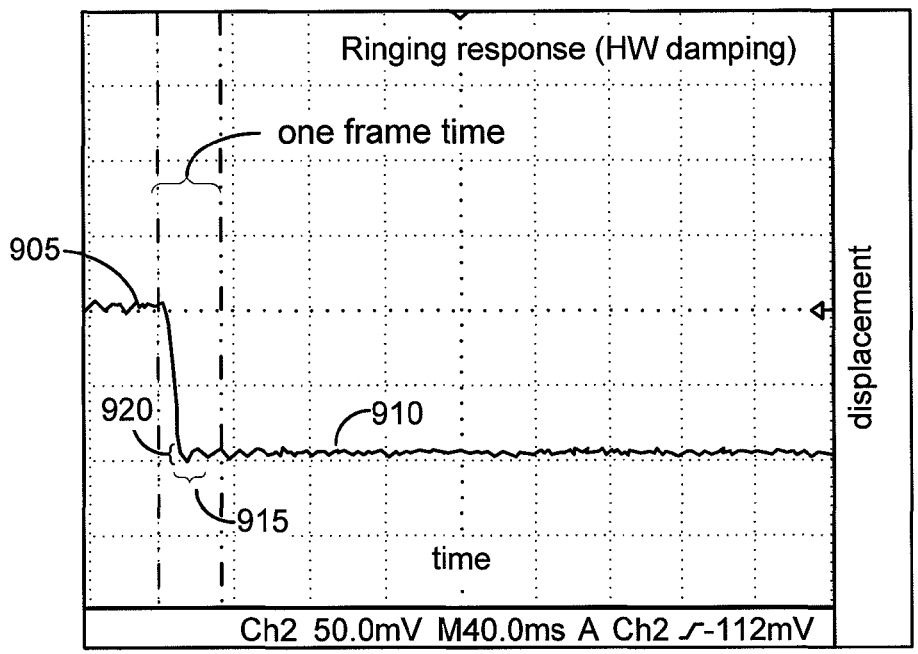
FIG. 9 shows an example of reduced lens vibration or ringing resulting from implementation of one or more of the embodiments described above.

FIG. 9 shows an example of reduced lens vibration or ringing resulting from implementation of one or more of the embodiments described above. FIG. 9 shows the position of a lens at a first position 905 and a second position 910. When the lens moves from first position 905 to second position 910, some moderate ringing or vibration is introduced. This vibration is shown with amplitude 920 for duration 915. However, compared to the ringing or vibration illustrated in FIG. 1, the duration and severity (amplitude) of the lens vibration is reduced in FIG. 9. Also note that the vibration introduced by the lens movement is mitigated within one frame time, thus providing for improved lens stability when an image is captured. This may result in a clearer image. This reduction in amplitude and duration of lens ringing may also provide for a reduced auto focus time or a more accurate autofocus process.

Figure 10:
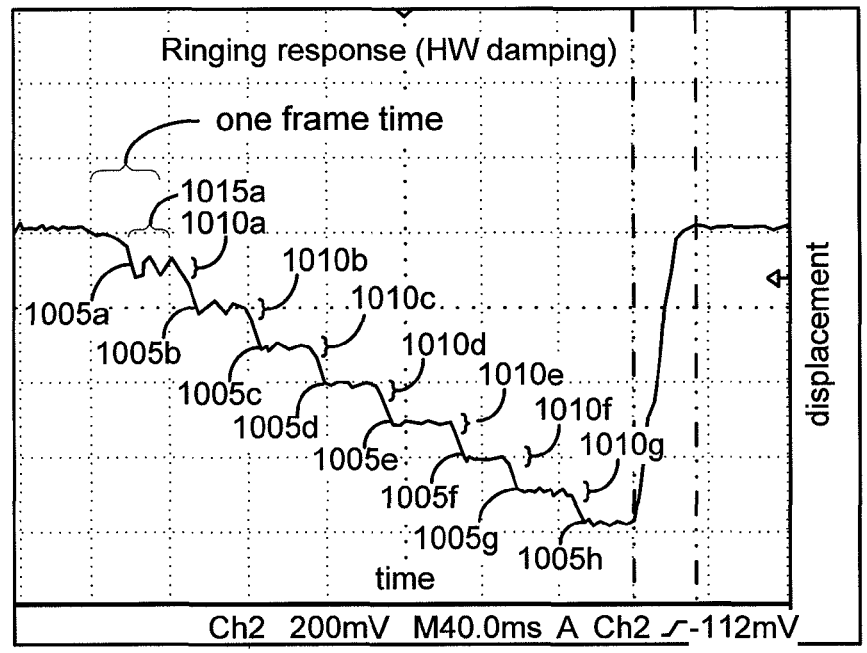
FIG. 10 shows an example of reduced lens vibration or ringing resulting from implementation of one or more of the embodiments described above.

FIG. 10 shows an example of reduced lens vibration or ringing resulting from implementation of one or more of the embodiments described above. FIG. 10 shows a lens being moved to a series of lens positions 1005a-h. The resulting ringing or vibrations are shown with amplitudes approximated as 1010a-h. As compared to FIG. 2, the magnitude and duration of the ringing introduced by the lens movement is reduced. This reduction is amplitude and duration of lens ringing may provide for a reduced auto focus time or a more accurate autofocus process. For example, note how the ringing of the lens after lens movement, for example, as shown by ringing 1015a, is substantially mitigated within one frame time.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A method of auto-focusing a lens, comprising:
   determining a current lens position;
   determining a target lens position;
   determining a direction of lens movement based on at least the current lens position and the target lens position;
   determining a magnitude of lens movement based on at least the current lens position and the target lens position;
   determining lens movement damping parameters based on at least the direction and magnitude of lens movement;
   determining lens movement parameters based on at least the lens movement damping parameters; and
   moving the lens based on the lens movement parameters to autofocus the lens.

2. The method of claim 1, further comprising:
   determining two or more lens movement regions based on at least the current lens position and the target lens position; and
   determining the lens movement damping parameters based on the two or more lens movement regions.

3. The method of claim 2, further comprising:
   determining a distance of lens movement within a lens movement region; and
   determining lens movement damping parameters corresponding to the lens movement region based on the distance of lens movement within the region.

4. The method of claim 2, wherein the regions are based on lens actuator characteristics across a lens displacement range.

5. The method of claim 2, wherein the lens moves through the at least two regions when moving from the current lens position to the target lens position.

6. The method of claim 2, wherein the damping parameters comprise a different lens movement step size and a different time delay between each step for at least two of the regions.

7. The method of claim 6, wherein determining the lens movement damping parameters comprises determining a digital to analog controller (DAC) code change per step for a first region, and determining a different digital to analog controller (DAC) code change per step for a second region.

8. The method of claim 1, wherein the damping parameters comprise a lens movement step size and a time delay between each step.

9. An apparatus for auto-focusing a lens, comprising:
   a lens;
   a lens actuator;
   a processor, operably coupled to the lens actuator;
   a memory, operably coupled to the processor, and configured to store:
   an auto focus control module, configured to determine a current lens position and a target lens position, and to determine a magnitude and direction of lens movement based on the current and target lens positions;
   a lens damping parameters determination module, configured to determine lens movement damping parameters based on at least the magnitude and direction of lens movement;
   a lens movement parameters determination module, configured to determine lens movement parameters based on the lens movement damping parameters; and
   a lens movement control module, configured to move the lens based on the lens movement parameters to autofocus the lens.

10. The apparatus of claim 9, further comprising a lens actuator characteristics determination module configured to determine two or more lens movement regions based on the current lens position and the target lens position, wherein the lens damping parameters determination module is further configured to determine the lens movement damping parameters based on the two or more lens movement regions.

11. The apparatus of claim 10, wherein the lens damping parameters determination module is further configured to determine a distance of lens movement within a lens movement region, and determine lens movement damping parameters corresponding to the lens movement region based on the distance of lens movement within the region.

12. The apparatus of claim 10, wherein the two or more lens movement regions are based on lens actuator characteristics across a lens displacement range.

13. The apparatus of claim 10, wherein the lens moves through the two or more lens movement regions when moving from the current lens position to the target lens position.

14. The apparatus of claim 9, wherein the damping parameters comprise a lens movement step size and a time delay between each step.

15. An apparatus for auto-focusing a lens, comprising:
 means for determining a current lens position and a target lens position;
 means for determining a direction of lens movement based on at least the current and target lens position;
 means for determining a magnitude of lens movement based on at least the current and target lens position;
 means for determining lens movement damping parameters based on at least the direction and magnitude of lens movement;
 means for determining lens movement parameters based on the a lens movement damping parameters; and
 means for moving the lens based on the first lens movement parameters to autofocus the lens.

16. The apparatus of claim 15, further comprising means for determining two or more lens movement regions based on the current lens position and the target lens position, wherein the means for determining lens movement damping parameters is configured to determine the lens movement damping parameters based on the two or more lens movement regions.

17. The apparatus of claim 16, wherein the two or more lens movement regions are based on lens actuator characteristics across a lens displacement range.

18. The apparatus of claim 16, wherein the lens moves through the two or more lens movement regions when moving from the current lens position to the target lens position.

19. The apparatus of claim 15, wherein the damping parameters comprise a lens movement step size and a time delay between each step.

20. A non-transitory computer readable medium comprising instructions that when executed cause a processor to perform a method of auto-focusing a lens, the method comprising:
 determining a current lens position;
 determining a target lens position;
 determining a direction of lens movement based on at least the current lens position and the target lens position;
 determining a magnitude of lens movement based on at least the current lens position and the target lens, position;
 determining lens movement damping parameters based on the direction and magnitude of lens movement;
 determining lens movement parameters based on the lens movement damping parameters; and
 moving the lens based on the lens movement parameters to autofocus the lens.

21. The non-transitory computer readable medium of claim 20, the method further comprising:
 determining two or more lens movement regions based on the current and target lens positions; and
 determining the lens movement damping parameters based on the two or more lens movement regions.

22. The non-transitory computer readable medium of claim 21, the method further comprising:
 determining a distance of lens movement within a lens movement region; and
 determining lens movement damping parameters corresponding to the lens movement region based on the distance of lens movement within the region.

23. The non-transitory computer readable medium of claim 21, wherein the regions are based on lens actuator characteristics across a lens displacement range.

24. The non-transitory computer readable medium of claim 21, wherein the lens moves through the at least two regions when moving from the current lens position to the target lens position.

25. The non-transitory computer readable medium of claim 20, wherein the damping parameters comprise a lens movement step size and a time delay between each step.

* * * * *